United States Patent
Vendrow et al.

(10) Patent No.: US 11,669,728 B2
(45) Date of Patent: Jun. 6, 2023

(54) SYSTEMS AND METHODS FOR RECOGNIZING USER INFORMATION

(71) Applicant: RingCentral, Inc., Belmont, CA (US)

(72) Inventors: Vlad Vendrow, Reno, NV (US); Erik Parland, Saint Petersburg (RU); Dmitry Pevzner, Saint Petersburg (RU); Ilya Mikhailov, Saint Petersburg (RU)

(73) Assignee: RingCentral, Inc., Belmont, CA (US)

( * ) Notice: Subject to any disclaimer, the term of this patent is extended or adjusted under 35 U.S.C. 154(b) by 868 days.

(21) Appl. No.: 16/583,875

(22) Filed: Sep. 26, 2019

(65) Prior Publication Data

US 2020/0349429 A1 Nov. 5, 2020

Related U.S. Application Data

(63) Continuation of application No. PCT/RU2019/000303, filed on Apr. 30, 2019.

(51) Int. Cl.
*G06N 3/08* (2023.01)
*G06N 3/10* (2006.01)

(52) U.S. Cl.
CPC ...... *G06N 3/08* (2013.01); *G06N 3/10* (2013.01)

(58) Field of Classification Search
CPC .......... G06N 3/10; G06N 3/0454; G06N 3/08; G06N 3/0445; H04N 7/15
See application file for complete search history.

(56) References Cited

U.S. PATENT DOCUMENTS

2016/0191958 A1 * 6/2016 Nauseef ................ G06V 40/20
725/116

FOREIGN PATENT DOCUMENTS

| WO | WO 2017/190938 | * 11/2017 | ............. G06F 19/00 |
| WO | WO2017/190938 A1 | 11/2017 | |

* cited by examiner

*Primary Examiner* — Yosef K Laekemariam
(74) *Attorney, Agent, or Firm* — Finnegan, Henderson, Farabow, Garrett & Dunner, LLP

(57) ABSTRACT

A conferencing system is configured, for an interval of time, to receive time-dependent input data from a first user, the time-dependent input data obtained via a capturing device. The conferencing system is configured to receive profile data for the first user, analyze the time-dependent input data and the profile data for the first user using a computer-based model to obtain at least one classifier score for a classifier of a reaction of the first user, and transmit the at least one classifier score for the classifier to a second user.

20 Claims, 11 Drawing Sheets

SYSTEMS AND METHODS FOR RECOGNIZING USER INFORMATION

RELATED APPLICATIONS

This application claims is a continuation of International Patent Application No. PCT/RU2019/000303, filed on Apr. 30, 2019, which is incorporated herein by reference in its entirety.

TECHNICAL FIELD

The present disclosure generally relates to the field of conferencing systems and, more particularly, methods and systems for video conferencing platforms and systems.

BACKGROUND

Effective sharing of ideas during a conferencing session allows participants to provide feedback to a presenter, encourages participants to express new ideas, and motivates participants to discuss presentation topics and questions. One of the ways to improve the feedback to the presenter is by collecting various information related to a participant such as audio data, video data as well as the participant's feedback via text data and by analyzing the collected data. For example, the participant's collected data may be analyzed to determine some degree of engagement with the presentation.

Accordingly, there is a need for providing systems and methods that can assist participants, of a conferencing session, such as presenters, in obtained feedback from other participants via data collected during the conferencing session. The disclosed system and methods address the problems set forth above and/or other problems in the prior art.

SUMMARY

Consistent with a disclosed embodiment, a conferencing system is provided. The conferencing system may be configured, for an interval of time, to receive time-dependent input data from a first user, the time-dependent input data obtained via a capturing device. The conferencing system may be configured to receive profile data for the first user, analyze the time-dependent input data and the profile data for the first user using a computer-based model to obtain at least one classifier score for a reaction classifier, and transmit the at least one classifier score for the reaction classifier to a second user.

Consistent with another disclosed embodiment, a method for determining a time-dependent reaction classifier score for a reaction classifier for a user of a conferencing session is provided. The method may include for an interval of time obtaining, via a capturing device, a time-dependent input data for the user, and obtaining a base classifier score for the reaction classifier for the user by analyzing profile data for the user. The method may further include analyzing the time-dependent input data for the user using a computer-based model to obtain the time-dependent reaction classifier score for the reaction classifier, and adjusting the time-dependent reaction classifier score for the reaction classifier based on the base classifier score.

Consistent with another disclosed embodiment, a conferencing system is provided. The conferencing system may include a database, and an interface. The interface may be configured, for an interval of time, to receive time-dependent input data from a first user, the time-dependent input data obtained via a capturing device, and transmit the time-dependent input data to a computing system. The computing system may be configured to receive profile data for the first user, analyze the time-dependent input data and the profile data for the first user using a computer-based model to obtain at least one data score, and transmit the at least one data score to a second user.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Reference will now be made in detail to example embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments.

Thus, the materials, methods, and examples are illustrative only and are not intended to be necessarily limiting.

Figure 1:
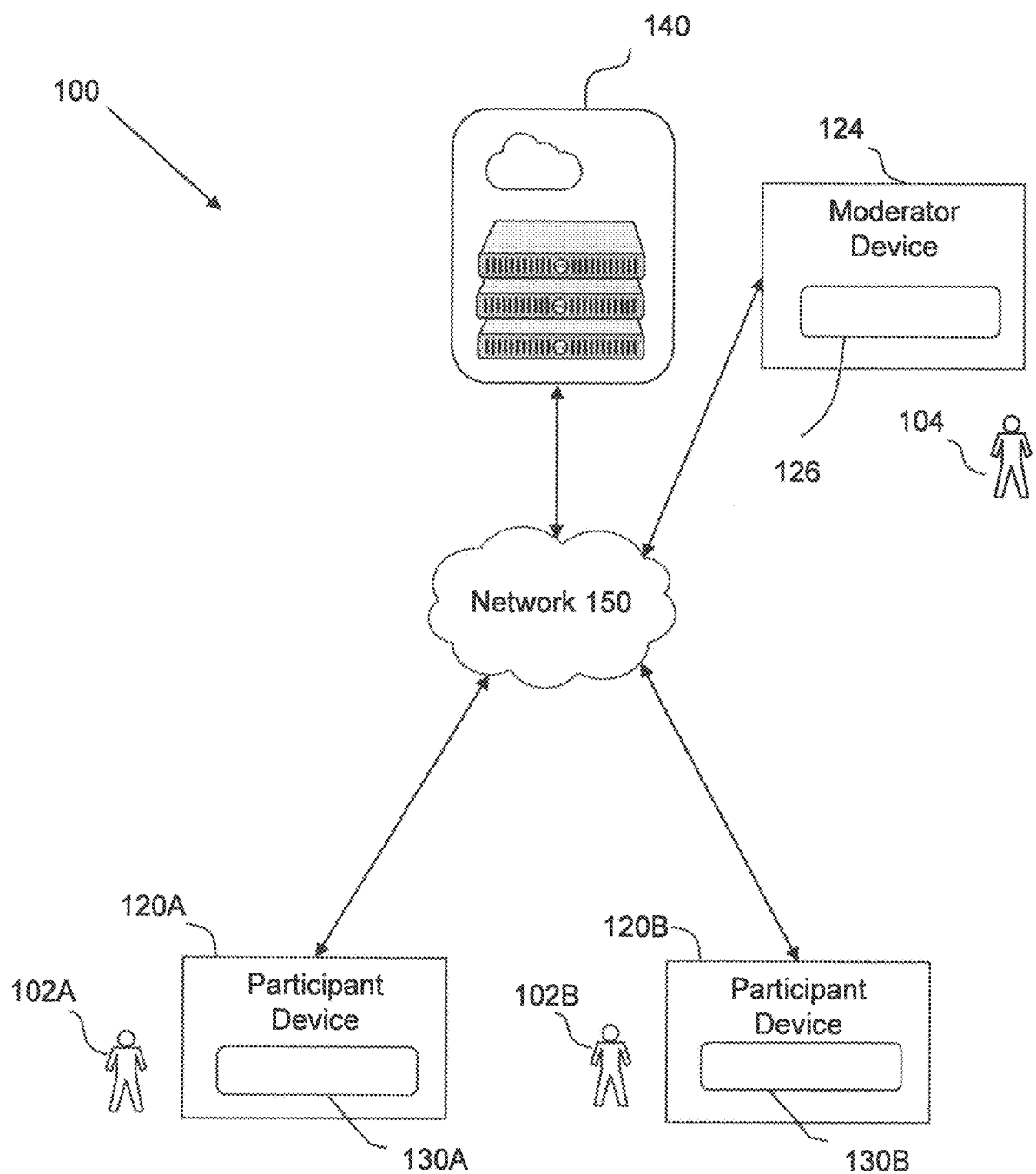
FIG. 1 is a diagram of an example embodiment of a conferencing system consistent with disclosed embodiments.

The disclosed embodiments describe various aspects of a conferencing system shown in FIG. 1. In some example embodiments, the conferencing system may be used by participants to share electronically any suitable content during a conference. The content may include video, audio, slides, images, and text. In some examples, during a conferencing session, the participants may share multimedia content including documents, pictures, video clips, text messages, etc. The terms "conference," "conferencing," or a "conferencing session" may refer to a meeting between participants (also referred to as users or attendees) during which any suitable multimedia content may be shared. It should be noted that, in some embodiments, audio content alone may be shared (e.g., during a teleconference) or shared with another type of content. In some embodiments, content may be shared continuously (e.g., during a teleconference conversation), periodically at a specific time interval, or at a discrete time(s) (e.g., when participants exchange notes on a given subject).

In various embodiments, the conferencing system may include a web conferencing platform allowing participants real-time sharing of computer screens, individual computer applications or web-based content among computers and mobile devices of the participants. The web conferencing platform may be internet-based software as a service (SaaS) system. As another example, the conferencing system may include participants attending a lecture or a meeting at a location and interacting with each other in person and through mobile devices. For example, participants may attend a lecture and interact with each other through mobile devices while listening to a lecture.

The present disclosure arises from, among other things, the realization that additional background information collected about a participant prior to a conference, as well as emotional and factual information about the participant collected during the conference, may improve the the conference for all of its participants. In various embodiments, background information may include various publicly available information about the participant (e.g., a place of birth, nationality, language, favorite hobby, educational degree, religious views, political views, etc.). Additionally, background information may be related to prior activities of the participant that may be affecting the participant during the conference (e.g., the participant was at a party last night, the participant sick and the like). The emotional information may include types of emotions experienced by the participant (e.g., anger, happiness), and the factual information may be a point of view currently (or previously) maintained by the participant about a given topic (e.g., a topic that may be related to a discussion during the conference). Accordingly, there is a need for a conferencing system that can assist participants in obtaining feedback from other participants about other participant's emotional and factual reactions during the conferencing session.

Reference is now made to FIG. 1, which shows an illustrative conferencing system 100 enabling a plurality of users (also referred to as participants) 102A-102B (collectively referred to as users/participants 102) to interact with one another via the associated participant devices 120A-120B (collectively referred to as user/participant devices 120). In some cases, participant devices 120 may include one or more devices and, in some cases, may be a system of devices. For example, a participant presenting during the conferencing session may have more than one device. As used here, user/participant device 120 may also refer to a system of devices.

Participants 102 may use conference interface software application 130A-130B (collectively referred to as conference interface system 130) for communication during the conferencing session. In various embodiments, one or more components of conferencing system 100, such as components of a remote computing system 140, may be used to implement computer programs, applications, methods, processes, or other software to perform the described techniques and to realize the structures described herein. The components and arrangements shown in FIG. 1, are not intended to limit the disclosed embodiments, as the system components used to implement the disclosed processes and features may vary.

Conferencing system 100 may be configured to allow participants 102 to communicate with one another using a variety of devices, such as mobile computing devices (e.g., smartphone, tablet computing devices, netbooks, etc.), personal computers (e.g., notebook computers, desktop computers, etc.), gaming consoles, conferencing consoles (e.g., Dolby Conferencing Console), conference phones, projectors, conference cameras, television, audio conferencing console, video conferencing console, or other suitable devices. In various embodiments, conferencing system 100 may allow participants to communicate with one another using audio data that may include synchronous and/or asynchronous voice data. For example, synchronous voice data may include multi-directional live audio exchanges, such as voice-over-IP exchanges, or exchanges using other varieties of telephony. In a similar manner, an example of a synchronous visual media type may include a multi-party video conference (e.g., which may be effectuated using video-over-IP or other suitable video conferencing technology), streaming video broadcast by one participant to another participant, etc.

Various example embodiments of the conferencing system 100 may include computer-implemented methods, tangible non-transitory computer-readable mediums, and systems. The computer-implemented methods may be executed, for example, by at least one processor that receives instructions from a non-transitory computer-readable storage medium. Similarly, systems and devices consistent with the present disclosure may include at least one processor and memory, and the memory may be a non-transitory computer-readable storage medium. As used herein, a non-transitory computer-readable storage medium refers to any type of physical memory on which information or data readable by at least one processor can be stored. Examples may include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such as a plurality of memories or computer-readable storage mediums. As referred to herein, a "memory" may include any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method.

The term "computer-readable storage medium" should be understood to include tangible items and exclude carrier waves and transient signals.

In various embodiments, devices 120 may interact via network 150. Network 150 facilitates communications and sharing of conferencing content between the participant devices 120 and the remote computing system 140. The network 150 may be any type of networks that provides communications, exchanges information, and/or facilitates the exchange of information between the system 140 and participant devices 120. For example, the network 150 may be the Internet, a Local Area Network, a cellular network, a public switched telephone network ("PSTN"), or other suitable connection(s) that enables conferencing system 100 to send and receive information between the components of conferencing system 100. A network may support a variety of electronic messaging formats and may further support a variety of services and applications for participant devices 120.

Figure 2:
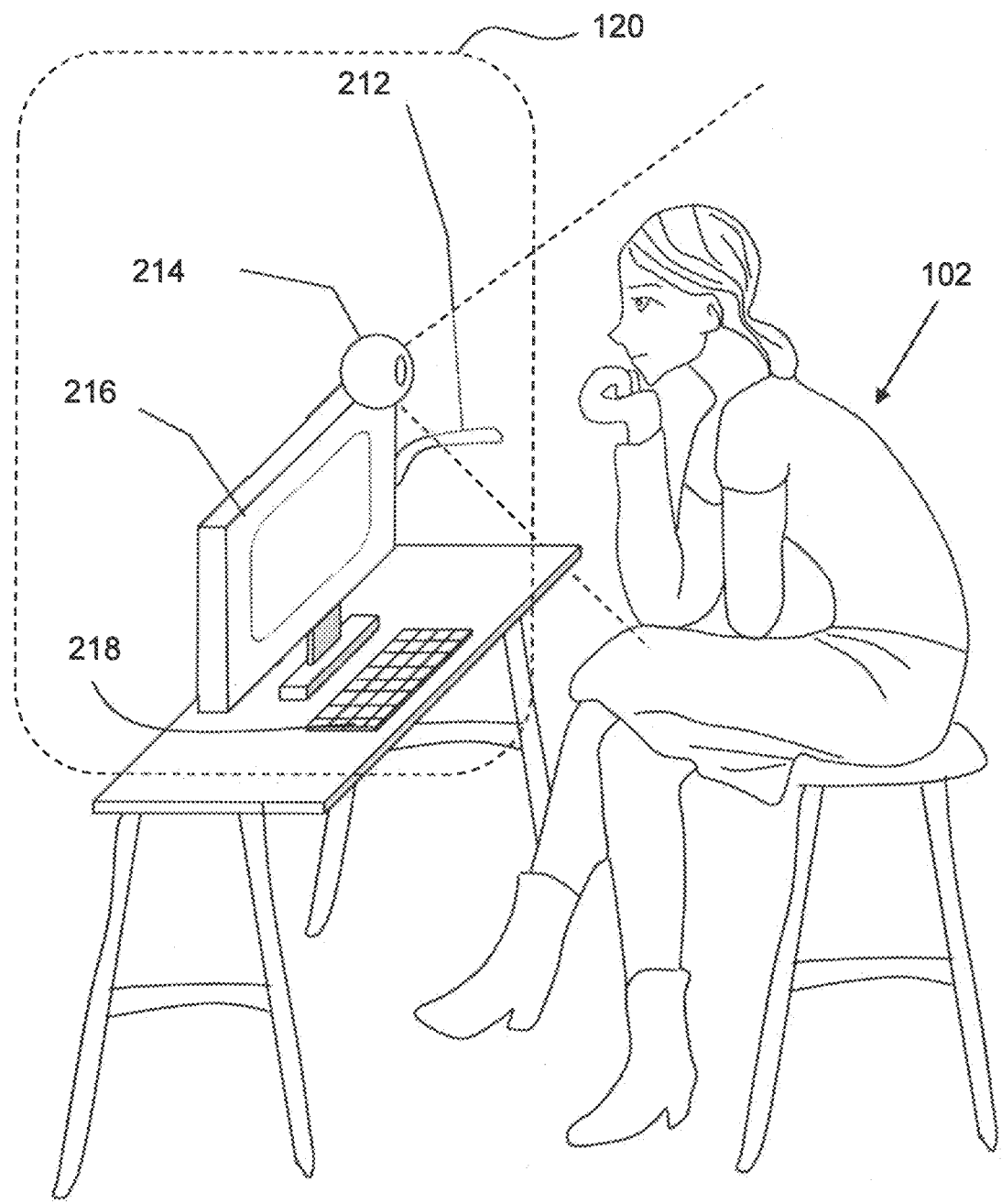
FIG. 2 is a diagram showing an example embodiment of a participant using a conference interface system, consistent with disclosed embodiments.

Participant devices 120 may include more than one computing/capturing devices. For example, participant devices 120 may include a capturing device such as a microphone or camera that may interact/connect wirelessly or by wire, in whole or in part, with a mobile computing device such as a smartphone. In some embodiments, more than one capturing device may be used. For example, FIG. 2, shows an example embodiment of participant 102 communicating with other participant 102 of conferencing system 100 via a user device 120 (e.g., a desktop computer shown in FIG. 2). In various embodiments, user device 120 may include various capturing devices for capturing time-dependent input data from participant 102.

As used herein, unless otherwise noted, the term "time-dependent input data" may include any suitable audio data (e.g., user voice data, background sound data and/or the like), video data (e.g., video data of facial expressions of the user, video data of body gestures, video data of user's hands, facial image data, iris image data, background image data and/or the like), user input data (e.g., data related to user interacting with an interface of conferencing session such as user clicking on various graphical user interface elements, etc. medical data (e.g., user blood pressure, pulse, etc.), as well as biometric data (e.g., user fingerprint data). Various aspects of time-dependent input data are further discussed below.

FIG. 2, shows some capturing devices 212, 214 and 218 that may be used to obtain the time-dependent input data. For example, device 212 may be a microphone; device 214 may be a camera and device 218 may be a keyboard. It should be understood that various other capturing devices may be used. For example, a display device 216 (e.g., a computer touch screen, a screen of a tablet or a mobile device, etc.) may be used for capturing a hand gesture of a user. Various devices may be designated to a specific type of time-dependent input data. In some embodiments, a wearable capturing device for recording blood pressure, pulse, blood sugar levels, and/or the like may be used.

Examples of possible capturing devices may further include a visible camera, infrared camera, audio recording device, ultrasound recording device, etc. While in many instances the capturing device may be a "passive device," that is a device that acquires the signals from an object without actively generating signals, in some embodiments, the capturing device may be an active device. For example, capturing device may be an "active device" if it is configured to emit electromagnetic radiation (e.g., light via photoflash), emit and detect ultrasound, and/or the like. For example, capturing device may include an infrared laser source or a visible light laser source. Such sources may facilitate measuring distance between the capturing device and participant 102 (e.g., an image capturing camera may measure the distance between the camera and a selected point on the participant's face) and assist in adjusting parameters of the capturing device based on the measured distance to participant 102.

In various embodiments, device 120 may include a display device 216 that may be configured to display various multimedia content communicated during a conference via a conference interface system 130 for participant 102. In some embodiments, display device 216 may include several display devices. In various embodiments, display device 216 of participant device 120 may be configured to display video data, and text data associated with conference, including the data related to interactions between various users.

Participant device 120 may also include one or more software applications that facilitate the participant devices to engage in communications, such as IM, text messages, EMAIL, VoIP, video conferences, with one another. These software applications may be used by conference interface system 130 to facilitate communication between the participants of a conferencing session.

In various embodiments, conferencing system 100 may differentiate between different users/participants. For example, a participant may be chosen to be a presenter. The term "presenter" refers to a participant who is presenting at a conferencing session. A presenter may share the contents (e.g., any suitable multimedia content) with other participants, and, in general lead the discussion during at least a portion of the conferencing session.

As used herein, the term "attendee" is used to indicate that a participant is not a presenter at a particular time, that is an attendee may not be configured to lead a presentation by sharing slides, images, and/or the like. In some embodiments, the attendee may ask other participants (e.g., a presenter or other attendees) questions, or provide feedback during a conferencing session. Attendees can become presenters and presenters can become attendees, as the conferencing session progresses.

In various embodiments, conferencing system 100 may include a moderator 104 as shown in FIG. 1 (also referred to as host). Moderator 104 responsibilities may include overall management of the meeting. Moderator 104 may include a moderator device 124 (e.g., a desktop computer, a laptop or a mobile device) running a conference interface 126 (e.g., a software application) for managing all aspects of the meeting and enabling participants to chat, send video, share information and interact with each other via documents, presentations, whiteboards, applications, and/or the like. Some of the common tasks of moderator 104 may include recording the meeting, inviting people to the meeting, selecting presenters, selecting another moderator, and sharing various information between the participants. In some embodiments, moderator 104 may be configured to have a private chat with a participant of the conferencing session, and in some embodiments, moderator 104 may remove a participant from the conferencing session. In various embodiments, moderator 104 (or a currently chosen presenter) may select a participant to be a presenter during the conferencing session. It should be noted, that moderator 104 may be a user of the conferencing session; however, moderator 104 may or may not directly participate in the conference. For example, moderator 104 may not be configured to listen to the audio content of the conferencing session and/or may be configured to receive only some of the multimedia content of the conferencing session.

Conferencing system 100 may include a conference interface system (CIS) 130 enabling various participants to interact with each other during the conferencing session. In various embodiments, CIS 130 may be a software application. In various embodiments, CIS 130 for presenter may be different than CIS 130 for an attendee. In various embodiments, to differentiate between CIS 130 designed for a presenter and for an attendee, CIS 130 for presenter may be referred to as the conference interface presenter system (CIPS) and CIS 130 for an attendee may be referred to as the conference interface attendee system (CIAS). In various embodiments, the software application of conferencing system 100 may be configured to change user interface from the CIPS to the CIAS depending on whether a participant is a presenter. In some embodiments, a conference interface moderator system (CIMS) may be different from the CRS and/or the CIPS. For example, CIS 130 may allow an attendee to receive multimedia content associated with a conferencing session, submit questions to the presenter and provide feedback to the presenter or other attendees regarding discussed topics. CIPS 130, on the other hand, may monitor various statistical aspects of the meetings such as attendee participation and various reactions from the attendees as discussed further below.

Figure 3:
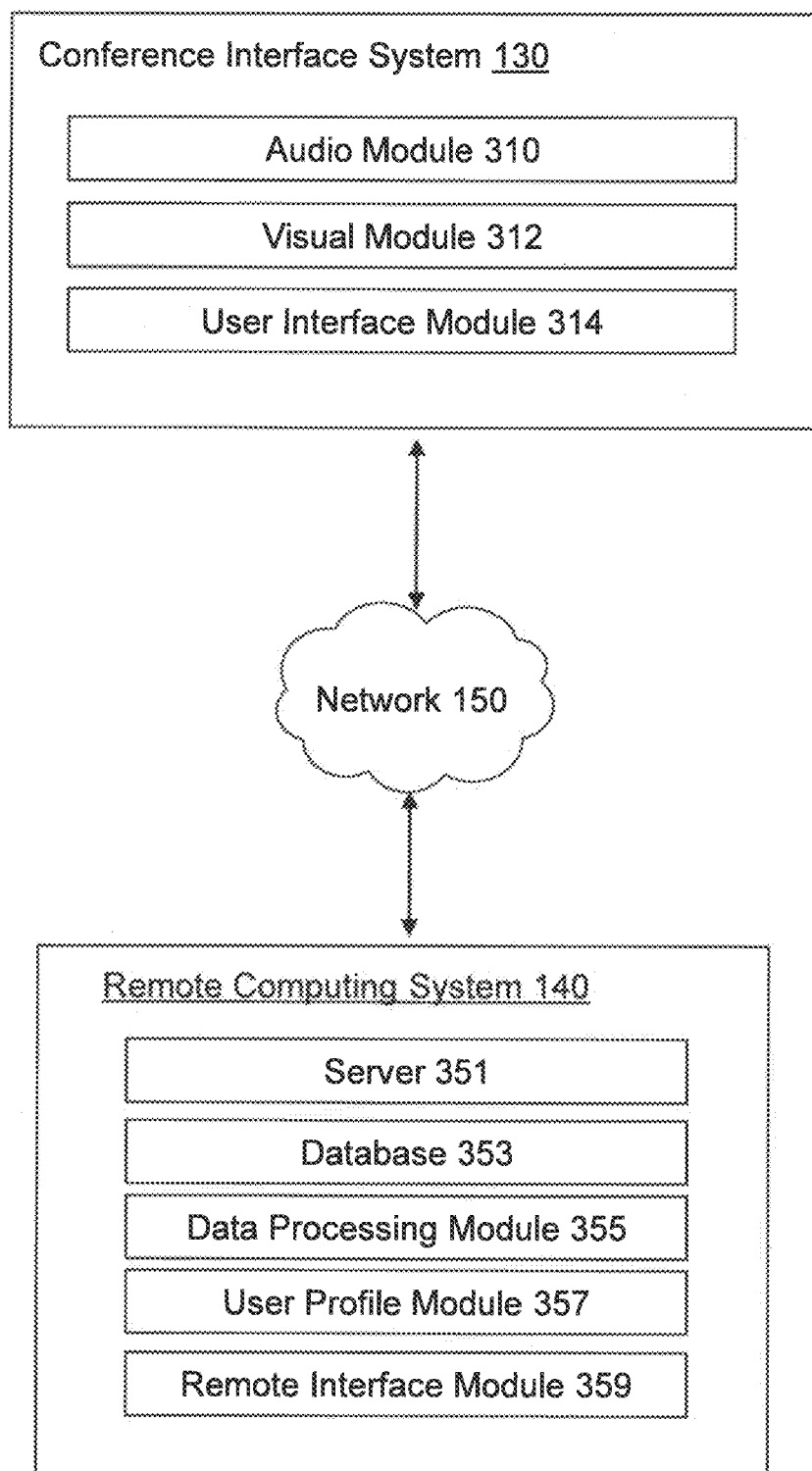
FIG. 3 is a diagram of illustrative components of a conferencing system consistent with disclosed embodiments.

In various embodiments. CIS 130 may have components that may be common to CIPS, CIAS, and CIMS. For example, FIG. 3 shows various components of CIS 130 such as an audio module 310, a visual module 312 and a user interface module 314.

Audio module 310 may include an audio capturing device (e.g., microphone) a transcription software for transcribing audio data associated with a user and a parsing software for parsing user-related data. In an example embodiment, transcription software may transcribe the audio data into text using a speech-to-text (STT) engine. The STT engine may, for example, use neural network models to convert audio signals into text. In some embodiments, the STT engine may recognize various languages. In some embodiments, the STT engine may be trained to recognized dialects and/or accents of languages. The STT engine may include an ensemble of neural network models, with each model trained to recognize a particular type of audio signals. In some embodiments, illustrative neural network models may be trained to recognize British English, Spanish, or audio signals associated with a male/female or child's voice. Examples of the neural network models are only illustrative, and various other computer-based models may be used by transcription software to recognize and transcribe audio signals into text. The audio signals that cannot be identified as words may be transcribed as a text string identifier such as "inaudible" or another appropriate string identifier.

In various embodiments, transcription software may include special alphanumerical characters or symbols (or combinations of alphanumerical characters and/or symbols) in the transcribed text data indicating other characteristics of a user speech. For example, similar to musical notes, the characters or symbols may record the sound volume of the user speech, as well as pitch and tempo of the speech, and related characters and/or symbols that are used to record music. In some embodiments, transcribed text data may contain text characters, words, and phrases containing "tags." In various embodiments, the tags may include special alphanumerical characters or symbols (or combinations of alphanumerical characters and/or symbols) indicating other characteristics of a user speech as described above.

Transcription software may process other user communication data. In some embodiments, when a participant uses graphical user interfaces (GUI) of CIS 130 for conferencing session, transcription software may transcribe user input actions relating to the user interacting with elements of GUI. In an embodiment, an illustrative element of GUI may include a button, a dropdown list, a radio button, a search field, a command field, or any other graphical element that may represent a user-defined command. In some embodiments, transcription software may transcribe user action associated with operating a telephone or other communication equipment containing physical controls such as for example, buttons. In some embodiments, the transcription software may receive video data associated with a video communication from a user and transcribe the audio portion of the video call.

In various embodiments, the transcribed data may be parsed by a parsing software. Parsing software may parse transcribed text data using a language parser to produce identified data objects. The language parser may assign labels to data objects of the transcribed text data, including labels identifying parts of speech. For example, the labels identifying parts of speech for the transcribed text data objects may be used as additional information when transcribed text data is processed by data processing module 355.

In various embodiments, an audio module 310 may be configured to exchange data with a remote computing system 140. For example, the transcription software may transmit the transcribed data to a server 351 of a remote computing system 140 via network 150 for data analysis and for obtaining verbal and nonverbal cues from the audio of the user. Additionally, or alternatively, the transcription software may obtain text data associated with the user communication and transmit the text data to server 351 of remote computing system 140 for analysis of the text data and for storing the data in database 353. In some embodiments, audio data of a speech including a sequence of phonemes of a participant may be transmitted to server 351 and stored in database 353.

The server 351 may be a computer-based system including computer system components, desktop computers, workstations, tablets, hand-held computing devices, memory devices, and/or internal network(s) connecting the components. The server 351 may be configured to provide conferencing services, such as setting up conferencing sessions for participants 102. The server 351 may be configured to receive information from participant devices 120 over the network 150, process the information, store the information, and/or transmit conferencing information to the participant devices 120 over the network 150. For example, the server 351 may be configured to present multimedia content to participants 102.

The database 353 includes one or more physical or virtual storages coupled with the server 351. The database 353 is configured to store multimedia content as well as time-dependent data associated with participants during the conferencing session. The time-dependent data may include annotations from the participants, as well as audio, video and chat communications between the participants. The data stored in the database 353 may be transmitted to and from the conferencing server 351 before a conferencing session or during an ongoing conferencing session. In some embodiments, the database 353 is stored in a cloud-based server (not shown) that is accessible by the server 351 and/or the participant devices 120 through the network 150. While the database 353 is illustrated as an external device connected to the server 351, the database 353 may also reside within the conferencing server 351 as an internal component of the server 351.

In some embodiments, audio module 310 may only record audio data from participant 102 and transmit the data to server 351 for subsequent analysis by a data processing module 355. In various embodiments, module 355 may include transcription and parsing software and may analyze the audio data (e.g., transcribe and parse audio data) as well as extract various verbal and nonverbal cues from the audio data. For example, module 355 may receive and analyze the audio or transcribed data to determine a reaction classifier associated with the data. It should be noted, that data processing module 355 is not limited to processing audio data and is configured to process any aspect of conference session data. Various aspects of data processing module 355 for processing other data (e.g., video data) are described below.

As used herein unless otherwise noted, the term "reaction classifier" refers to a data that can be used to classify a state of a participant during the conferencing session, particularly if the state of the participant changes due to the participant reacting to information that he/she receives during a conferencing session. Conferencing system 100 may support various reaction classifiers that may be obtained for participant 102 during the course of one or more conferencing sessions. Example reaction classifiers may include classifiers related to an emotional state or a mental state of participant 102. For example, reaction classifiers related to an emotional state may include frustration with the presentation, anger towards the presentation, enjoyment of the presentation, condescending reaction to a presenter of the presentation, respect to the presenter, and/or the like. As an example, the reaction classifiers related to the intellectual state may include an understanding of the presentation, attention to the presentation, or participation in the presentation. It should be noted that reaction classifiers described above are only illustrative and a variety of other reaction classifiers may be chosen. In some embodiments, reaction classifiers may be identified by CIS 130 by an associated emoji icon. For instance, CIPS may display various reaction classifiers from various participants during the conferencing session.

In various embodiments, reaction classifiers may have a classifier score associated with a reaction classifier. For example, a reaction classifier identifying the state of a participant as "happy" may have a score ranging from zero to a hundred where a score of a hundred may indicate great happiness of the participant to a conference material and a score of zero may indicate indifference of the participant to the conference material. As another example, the reaction classifier identifying the state of the participant as "participating" may also have a score ranging from zero to hundred, where a score of zero may indicate that the participant is not participating in the conferencing session. For example, the participant may be asleep, the participant is not looking at the content related to the conferencing session, or the participant is actively engaged in an activity that may not be associated with the conferencing session (e.g., the participant is reading a newspaper).

In some embodiments, CIS 130 may be configured to transmit any suitable data related to a participant during a conferencing session to server 351 to be stored in database 353. In various embodiments, the data stored in database 353 may be associated with a user profile module 357 shown in FIG. 3. In some embodiments, data processing module 355 may analyze various data stored in profile module 357 and evaluate the statistical characteristics of the participant based on various reaction classifiers and related classifier scores recorded during various conferencing sessions. Such statistical characteristics may indicate behavioral patterns for the participant. For example, module 355 may evaluate behavioral patterns based on various reaction classifiers associated with user happiness level and conclude that user 110 appears happy during various conferencing sessions. Such a happy disposition of user 110 may be a behavior pattern, and user 110 may have a base-level reaction classifier with an average classifier score that relates to such behavior pattern. For example, if user 110 appears happy most of the time, an average classifier score for base-level reaction classifier corresponding to happiness may be higher than 50 (with a score of 50 indicating no feelings of happiness or unhappiness). In some embodiments, module 355 may determine a base-level reaction classifier for a participant with a related base classifier score. For example, a participant may be classified as "involved" with a base classifier score (i.e., average classifier score) of fifty. In an example embodiment, when the reaction classifier score is similar to the base reaction classifier score for user 110, such score may be statistically insignificant. On the other hand, if the reaction classifier score differs substantially from the base reaction classifier score, the difference may be noted by CIS 130.

In various embodiments, the average classifier score may be obtained in a variety of ways. In an example embodiment, data processing module 355 may be configured to obtain the profile data for the user from profile module 357, where the profile data may include at least one time-dependent classifier score for the reaction classifier recorded during at least one previous conferencing session. In an example embodiment, computing the base classifier score may include obtaining one or more time average values for the one or more time-dependent classifier scores for the reaction classifier, and when more than one time average value is obtained, averaging the time average values.

In some embodiments, module 355 may be configured to calculate a variance of the reaction classifier. For example, a reaction classifier with a base classifier score of fifty may have a variance of 10 indicating that on average a classifier score for the reaction classifier may be different from the base classifier score of fifty by 10. Subsequent classifier scores for the reaction classifier may be normalized by a base classifier score to evaluate significant variation in the classifier score. For example, if during a conferencing session a reaction classifier "involved" may have a classifier score of 48, and the base classifier score is fifty, the normalized score may be computed as 48/50=0.96, and it may be concluded by module 355 that the classifier score does not significantly vary from the base classifier score. In an alternative example, when the classifier score is 5, and the normalized score is 5/50=0.1, it may be concluded by module 355 that the classifier score is significantly different from the base classifier score. It should be noted, that base classifier score may be significant only when the variance of the classifier score is sufficiently small as compared to the average of the classifier score (i.e., base classifier score). For example, if the variance of the classifier score is on the same order as the base classifier score of fifty, then any classifier score may be equally probable, and the base classifier score may not indicate the significance of the fact that the classifier score is different from the base classifier score.

In various embodiments, the behavior patterns of a participant may be involuntarily or habitual. For example, the participant may have a recurrent tic, cough, problem in pronouncing certain words, or any other involuntary or habitual behavior patterns (e.g., drumming fingers, interspersing swear words throughout the conversation, etc.), that may be detected by data processing module when obtaining reaction classifiers for the participant.

In various embodiments, audio data from a participant (e.g., a question asked by a participant during a conferencing session) may be analyzed via comprehension software to obtain a related reaction classifier. For example, by analyzing audio data from the participant, reaction classifier related to participant understanding the content of the conferencing session may be evaluated. Various other reaction classifiers may be inferred from the aspects of the audio data. For example, a reaction classifier associated with a lengthy, incomprehensible, vague or unfocused speech may be identified In various embodiments, reaction classifiers related to involuntary or habitual behavior patterns may be identified and ignored by CIS 130, while accounting for such behavior patterns when evaluating classifier scores for various other reaction classifiers (for example, if user 110 is known for drumming fingers, such behavior pattern should not influence a reaction classifier for user 110 associated with restlessness).

The comprehension software may, for example, analyze the user using a natural language processing to determine the subject matter (or a pattern) of the participant's audio/transcribed data. As used herein, the term "pattern" may refer to various aspects of a speech of a participant that may be identified as a statistically repeating event. For example, a pattern may be observed if a participant is frequently changing the subject of a conversation, or/and if the participant frequently repeats the same information. The comprehension software may determine the subject matter or the pattern of the participants audio/transcribed data by analyzing the key words found in transcribed text data or audio data.

Comprehension software may further identify the proficiency level of the user speech, that is a level of proficiency of the English language or any other suitable language, characterized by vocabulary and grammar usage of the participant. Comprehension software may additionally identify a choice of words (e.g., vocabulary or colloquialisms) for the user and select a related reaction classifier (e.g., a classifier indicating a level of English proficiency).

In various embodiments, comprehension software may include neural networks, recurrent neural networks (RNN) or convolutional neural networks (CNN) to process the text/audio data to identify various characteristics of the user. In some embodiments, a specific computer-based model (CM) (e.g., recurrent neural network) may be trained to identify a specific feature of the text data associated with the audio data of the participant.

Data processing module 355 may further analyze the audio characteristics of the participant's audio data. In various embodiments, module 355 may analyze a pitch, a tone, a cadence of the user speech, volume and a rate of a user speech to extract various characteristics from the speech, such as a tone of voice, an emotional content of the speech, or any other aspects that uniquely identify reaction characteristics for a participant based on the audio characteristics of the receiving data. For example, in various embodiments, computer-based model (e.g., neural network model) may be applied to identify an emotion of the participant from the sequence of the phonemes and to identify an amplitude of the emotion. In various embodiments, a reaction classifier may be assigned to the identified emotion, and a classifier score may be assigned to the identified amplitude of the emotion.

In some embodiments, module 355 may identify a gender of the user, an age of the user, a dialect of the user, or an accent of the user speech. It should be noted that even though age, gender, dialect and/or accent of the participant is not a type of classifier that is related to a participant reacting to a content of the conferencing session, nevertheless, for generality, such participant characteristics may be collected and may, for convenience, be labeled as "participant classifiers" emphasizing that these classifiers are not based on a reaction of the participant to the content of the conferencing session.

Returning to FIG. 3, CIS 130 may further include visual module 312 for obtaining reaction classifiers based on facial and body expression of a participant. Visual module 312 may include a capturing device that may be a camera. In an illustrative embodiment, visual module 312 may include a processor that may be configured to process and modify recorded video data. For example, the processor may be configured to brighten the video data. In an illustrative embodiment, the recording module may include several cameras. Different cameras of the recording module may record video at different zoom settings and from different directions allowing recording an immersive video. The term "immersive video" also known as 360-degree video may refer to video recordings where views in multiple directions are recorded at the same time. The video may be shot using an omnidirectional camera or a collection of cameras.

Figure 4:
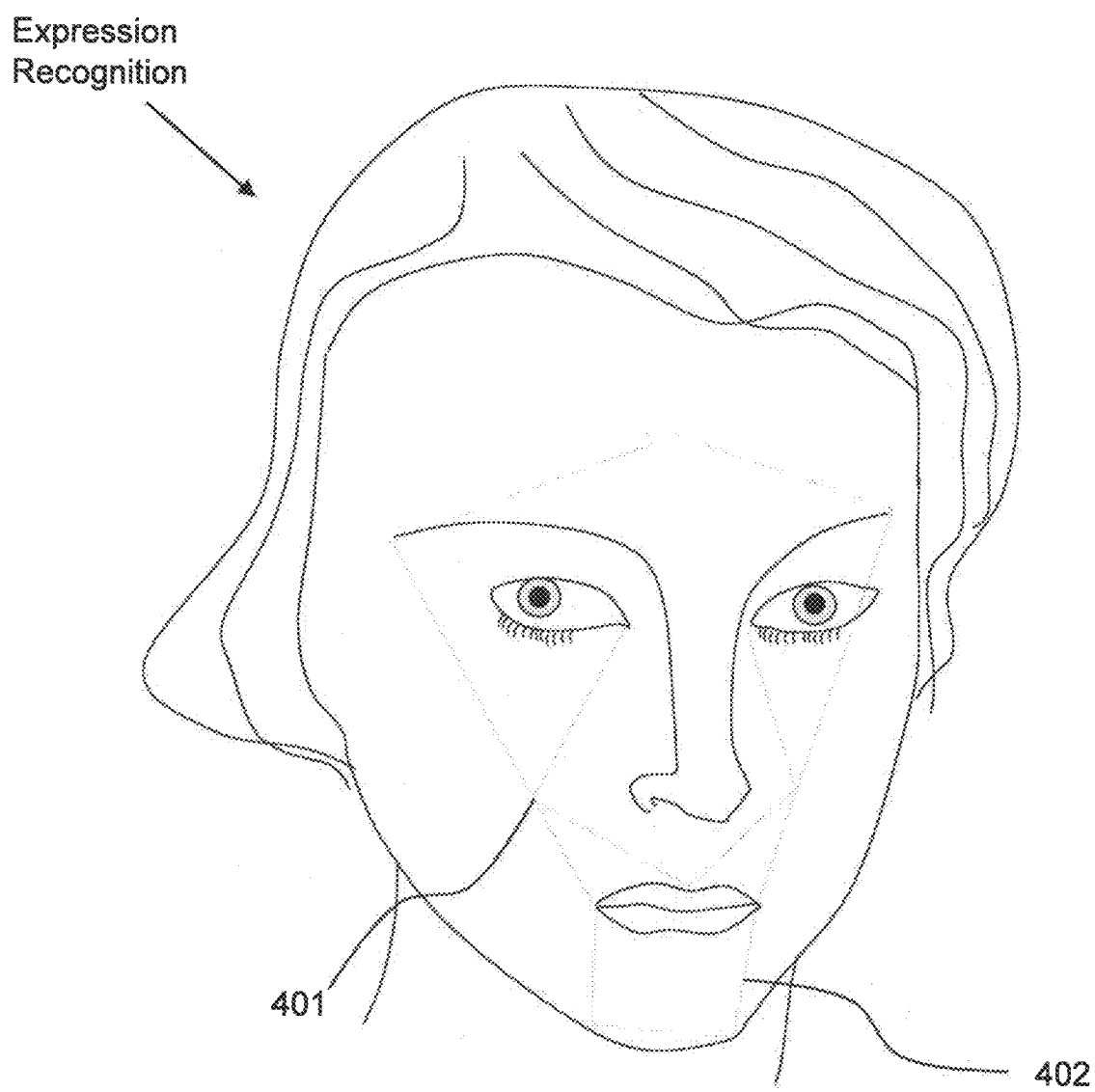
FIG. 4 is a diagram depicting an example embodiment of an algorithm for analyzing facial expressions, consistent with disclosed embodiments.

In some embodiments, visual module 312 may include an image analysis software on participant device 120. Additionally, or alternatively, image analysis software may be used by data processing module 355 for processing video/image data transmitted to module 355 by visual module 312. In various embodiments, image analysis software may be used to recognize reaction classifiers associated with the participant's emotions. For example, a computer-based neural network model, such as convolutional neural networks (CNNs) may be effective for recognizing emotions in the facial images of the participants. In some embodiments, as shown in FIG. 4, points 401 and distances 402 may be tracked (including tracking a motion of points 401 and a change in distances 402) to evaluate the participant's emotions. For example, image analysis software may recognize a smile of a participant, a frown of a participant, a participant's surprise and/or the like. In various embodiments, image analysis software (also referred to as computer-based model) may analyze time-dependent input data from a participant that may comprise a sequence of images of a face of the participant. The image analysis software may obtain at least one classifier score for a reaction classifier by identifying an emotion of the participant from the sequence of the images and by assigning a reaction classifier to the identified emotion. In various embodiments, image analysis software may identify an amplitude of the emotion, and assigning a classifier score for the identified amplitude. In some embodiments, image analysis software may analyze time-dependent input data from a participant that may comprise a sequence of images of various body gestures (or body positions) of the participant.

In various embodiments, CIS 130 may include a user interface module 314 that may include display device 216 having a screen for displaying multimedia contents to a participant. The participant may interact with graphical user input elements (e.g., buttons, dropdown lists, search fields, command fields, whiteboard, lines, shapes, text fields, etc.)

via mouse, keyboard, audio commands, or gestures (e.g., hand gestures such as pan gesture, zoom gesture, etc.). As used herein, such input may be referred to as "action input." For example, action input may include text messages submitted to other participants, sketches and drawings submitted as multimedia content for conferencing session, and/or any other suitable input that uses GUI of user interface module 314. In various embodiments, action input of the participant may be transmitted to server 351, recorded in database 353, be associated with user profile module 357 and may be analyzed by processing module 355 for finding reaction classifiers. As used herein the term "associated with user profile" when applied to various input data obtained from a participant and stored in database 353, indicates that there is a link to the data from user profile module 357. In some embodiments, user profile module 357 may provide an interface for a user or application programming interface (API) for computer-based models to access various data for the participant.

In various embodiments, various reaction classifiers may be stored in database 353 and associated with user profile module 357 for one or more conferencing sessions participated by conference attendees. In various embodiments, a remote interface module 359 may be configured to transmit various reaction classifiers from various participants to at least one user/participant (e.g., presenter) of the conference or in some cases, reaction classifiers may be configured to be transmitted to a moderator that may or may not be a participant of the conferencing session. For example, moderator 104 may be configured to host several conferencing sessions at the same time and may receive only limited multimedia content associated with each conferencing session.

In various embodiments, processing and analysis of any suitable data related to participant 102 may be distributed between various modules of conference interface system 130 and modules of remote computing system 140. For example, system 130 and system 140 may analyze and manage the data of participant 102 to minimize the impact on network 150 and system resources. In an example embodiment, system 130 may minimize the network impact by collecting and processing participant 102 audio and video data using respective modules 310 and 312. For example, module 310 may transcribe the audio data and module 312 may compress the video data prior to transmitting the video data to server 351 of remote computing system 140. It should be noted, that examples of data processing by module 310 and module 312 are only illustrative, and any other suitable data processing may be used by these modules prior to transmitting data to server 351. In some embodiments, participant device 120 may be configured to complete all the data processing/data analysis prior to submitting the processed data to server 351.

In various embodiments, processing and analysis of data related to participant 102A may be distributed via server 351 to all of the participant devices (e.g., devices 120A and 120B) used for conferencing session. In some embodiments, server 351 may be configured to distribute the data based on the processing power of devices 120A and 120B, network bandwidth for devices 120A and 120B, CPU usage of devices 120A and 120B, and/or the like. In some embodiments, the data may be distributed between devices 120A and 120B as well as remote computing system 140. In some embodiments, data can be rebalanced (i.e., redistributed between devices 120A and 120B) for any suitable reason (e.g., when device 120B is offline, when device 120B is overloaded, or when participant 102B is preventing device 120B from engaging in the data processing).

Figure 5:
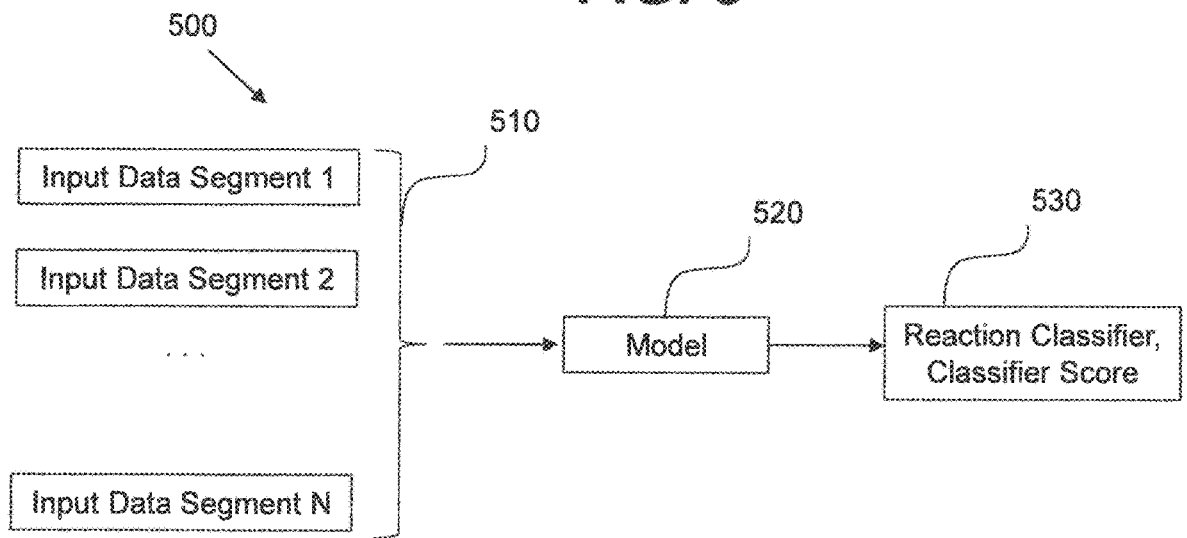
FIG. 5 is a diagram of an illustrative computer-based model for obtaining a classifier score, consistent with disclosed embodiments.

FIG. 5 shows an exemplary process 500 of obtaining a classifier score 530 using a computer-based model 520 for input data 510 represented by a number of individual input data segments 1 through N. In various embodiments, classifier score 530 may be calculated using computer-based model 520 that may include machine-learning models, such as neural networks, decision trees, and models based on ensemble methods, such as random forests. The machine-learning models may have parameters that may be selected for optimizing the performance of model 520. For example, parameters specific to a particular type of model (e.g., the number of features and number of layers in a neural network) may be optimized to improve the model's performance. In some embodiments, as shown, for example, in FIG. 5 model 520 may return a reaction classifier and a classifier score corresponding to the reaction classifier. For example, the reaction classifier returned by model 520 may be used to determine a facial expression (e.g., happy, or sad expression). In some embodiments, the classifier score may be characterized by a single number, and in some embodiments, model 520 may return a probability distribution of possible classifier scores 530. It should be noted that model 520 may be designed for a specific type of input and a specific reaction classifier. For example, model 520 may be designed to analyze images of a participant's face and to determine reaction classifier associated with the participant's facial expressions. Additionally, or alternatively, model 520 may be used for to analyze audio data such as a speech of a participant and to determine reaction classifier associated with various attributes of participant's speech (e.g., pitch of the speech, loudness of the speech, a tone, a cadence of the user speech, and the like). In some embodiments, reaction classifiers may be associated with various known expressions, and model 520 may be configured to return an appropriate reaction classifier when it recognizes the known expression. For example, if participant 102 uses an expression "we had a productive meeting," model 520 may determine that participant 102 has a favorable perception of the conferencing session (i.e., participant 102 is happy).

In some embodiments, model 520 may include a set of interacting models that can simultaneously process audio and video data as well as data related to participants 102 interacting with CIS 130 (i.e., action inputs associated with participant's screen gestures, participant's chat, or participants interacting with GUI elements). In an example embodiment, a first model within the set of interacting models may process audio data of a first participant and extract known expressions from the data. For example, the first model may recognize words and phrases "I am sorry," "unacceptable," "I prefer a different approach," and the like, and may output a reaction classifier "unhappy." This reaction classifier may be used by a second model within the set of interacting models that may process video data related to the first participant (or related to a participant interacting with the first participant). For example, if the first classifier is "unhappy" the second model may confirm or repudiate the first classifier. Additionally, or alternatively, the second model may calculate a classifier score for the first reaction classifier. It should be noted, that in addition to recognizing reaction classifiers, interacting models within the set of models may analyze video/audio and action input to get information that may be used by CIS 130 in a variety of ways. For example, an interactive model may be configured to use facial recognition to recognize a participant of the conferencing session. Once the participant has been recognized, CIS 130 may be configured to access user profile data and evaluate the statistical characteristics of the participant based on various reaction classifiers and related classifier scores found in the user profile.

Figure 6:
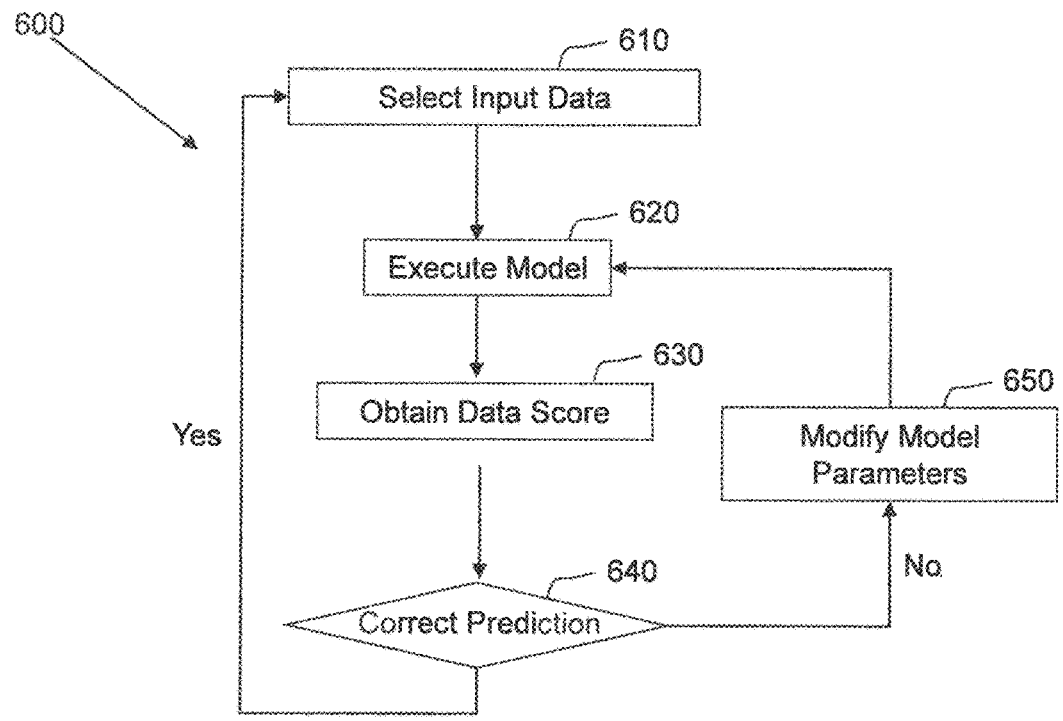
FIG. 6 is a flowchart of an illustrative process of training computer-based models, consistent with disclosed embodiments.

In various embodiments, model 520 may be trained using a data set containing information related to input data and related classifier score 530 that may have been previously computed for the input data. FIG. 6 shows an example embodiment of process 600, for training model 520. At step 610, training data is selected for training the model. In various embodiments, the training data may include a set of data records with each data record containing an image of a face with the image having a reaction classifier (e.g., happiness) and a corresponding reaction classifier score. In some embodiments, training dataset may include a variety of images related to facial expressions (e.g., happy facial expressions such as smile, a sad facial expression such as frown and the like). The training data containing images of a face with a reaction classifier described here is only illustrative, and various other types of training data may be used. For example, training data may include happy audio/verbal reactions (e.g., laugh) or sad audio verbal reactions (e.g., audible crying).

In various embodiments, model 520 may receive simultaneously multiple types of training data. For example, model 520 receives as an input a facial expression corresponding to a laughing face, an audio reaction corresponding to laugh, and a reaction classifier associated with such data (e.g., reaction classifier corresponding to happiness with a high classifier score).

In various embodiments, training data may include multiple data records, with each record processed consecutively by model 520. At step 610 of process 600, model 520 can acquire a training data record, at step 620 perform computations, and at step 630 return a predicted classifier score. In various embodiments, the predicted classifier score may be compared with the classifier score contained within the data record to evaluate an associated error for model 520 at a step 640. If the error is below the threshold value (step 640, NO), process 600 may proceed to step 610 of acquiring a next training data record. If the error is above the threshold value (step 640, YES), process 600 may proceed to a step 650 of modifying model parameters and subsequently returning to step 620. In various embodiments, model 520 may be rated based on the average error generated by model 520. In various embodiments, model 520 may be tailored for each reaction classifier and each type of input data.

In various embodiments, model 520 may be a rule-based model for evaluating a reaction classifier. In an example embodiment, model 520 may be used to recognize the reaction classifier associated with human emotion. For example, model 520 may be based on the facial action coding system (FACS) that can be used to classify human facial movements by their appearance on the face of a person. FACS may be used to systematically categorize the physical expression of emotions. In various embodiments, FACS can be used to deconstruct a facial expression into specific action units. The action units may be related to contraction or relaxation of one or more of facial muscles. In an example embodiment, FACS can be used to distinguish various types of smiles based on contraction of facial muscles (e.g., an insincere smile may include contraction of zygomatic major, and an involuntary smile may include contraction of zygomatic major and inferior part of orbicularis oculi). Additionally, or alternatively, model 520 may be configured to track a movement of facial points (e.g., selected points on the face of participant 102). For example, such points may be points around eyes, nose, lips, eyelids, chin, cheek, forehead, and/or the like. Model 520 may also calculate the distances between each pair of points and the angle made by each pair with a chosen axis (e.g., horizontal axis). In various embodiments, model 520 may correlate the emotion experienced by participant 102 with the position of the facial points, the distances between the points, and/or the movement of the points.

In various embodiments, multiple computer-based models may be used to recognize the emotion experienced by participant 102. For example, a first computer-base model may be used to recognize the emotion associated with audio data for participant 102, and a second computer-based model may be used to recognize the emotion associated with video data for participant 102. In some embodiments, the first and the second computer-based model may assign a likelihood value (e.g., probability value) for recognizing the emotion that may range between zero and one. In various embodiments, a correlation between the result from the first and the second computer-based model may be used to increase the probability that the emotion is correctly recognized.

It should be noted, that the rule-based computer-based model may be used to evaluate various reaction classifiers (e.g., the reaction classifiers not related to human emotions). For example, to evaluate a reaction classifier related to participation of participant 102 during a conferencing session, a computer-based model may evaluate a number of questions answered by participant 102, a number of questions asked by participant 102, feedback from participant 102, and/or the like.

Figure 7A:
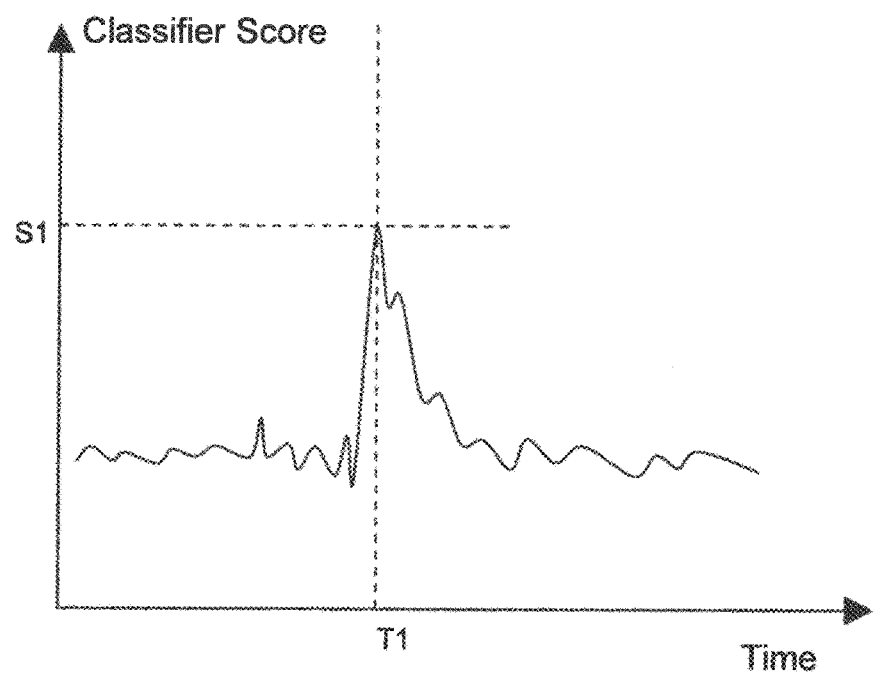
FIGS. 7A and 7B are illustrative graphs of time-dependent classifier score, consistent with disclosed embodiments.
Figure 7B:
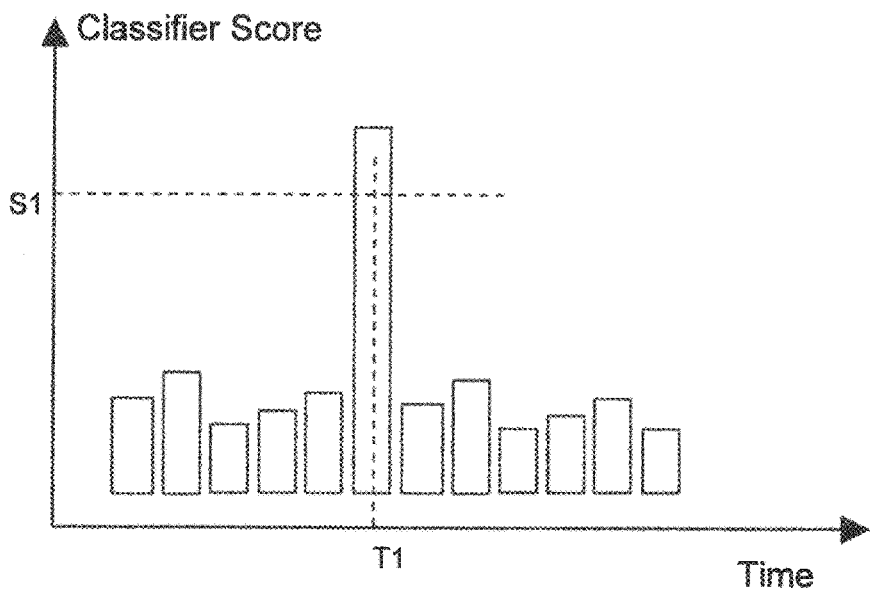

In various embodiments, model 520 may plot a classifier score for a reaction classifier. For example, a reaction classifier "attention" may be related to how much attention a participant is paying to the content of the conferencing session. FIGS. 7A and 7B may show variations in the classifier score as a function of time. For example, in FIG. 7A the classifier score may be evaluated continuously with time and in FIG. 7B the classifier score may be evaluated discretely at certain time points (or time intervals). FIGS. 7A and 7B show that the classifier score may exhibit a peak at a time $T_1$ and obtain a value $S_1$ as shown in FIGS. 7A and 7B.

Figure 8:
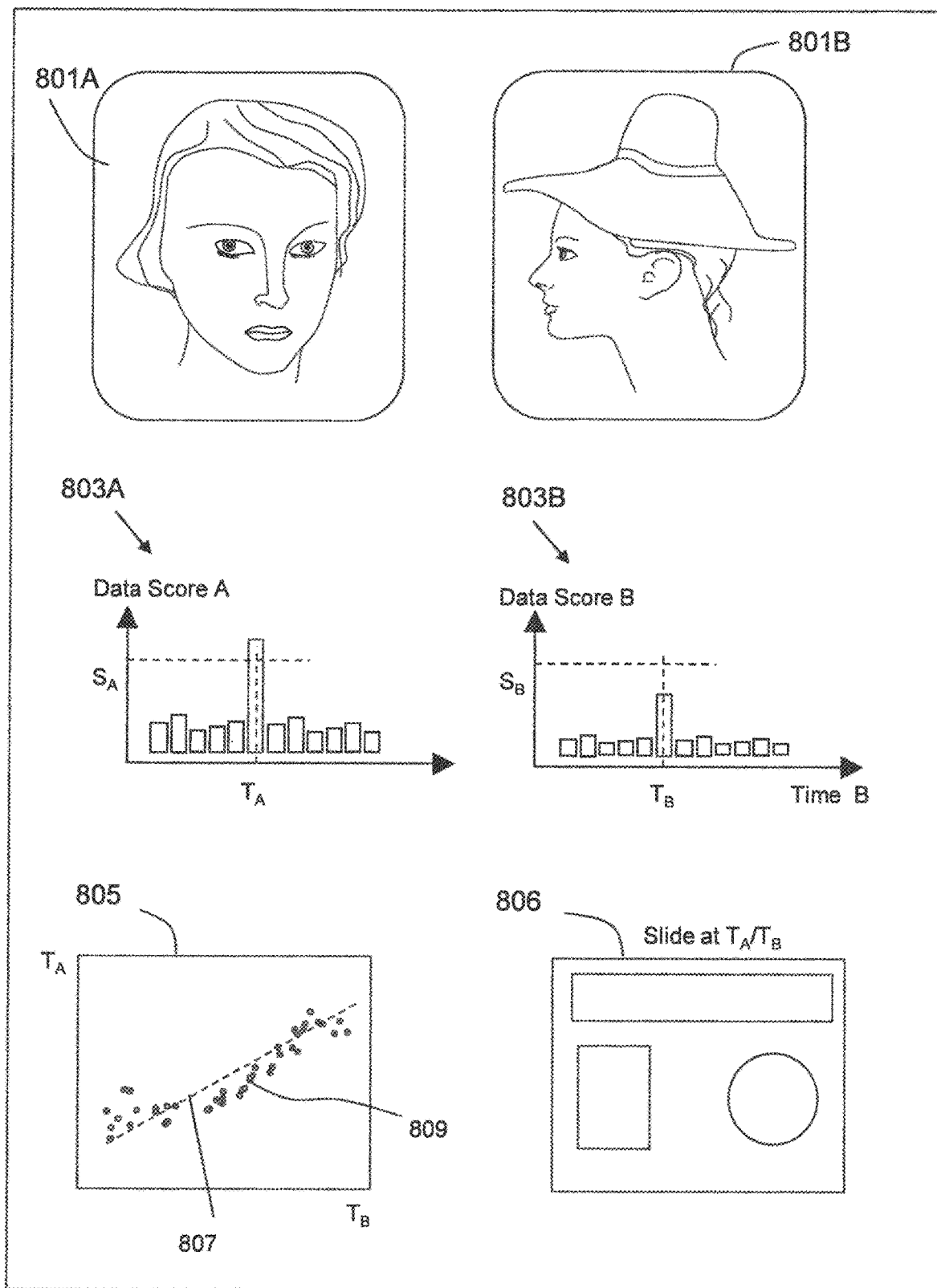
FIG. 8 is a diagram showing an example conference interface system for a presenter, consistent with disclosed embodiments.

FIG. 8, shows an example embodiment of a conference interface presenter system (CIPS) 130 that shows video feeds 801A and 801B of several participants (e.g., participant A and participant B corresponding to video feeds 801A and 801B), and time-dependent plots 803A and 803B of a reaction classifier (e.g., a reaction classifier "attention") plotted for the corresponding participants A and B. CIPS 130 may be configured to enable the presenter to visually identify time values ($T_A$ and $T_B$) for peak values for the reaction classifiers as shown by plots 803A and 803B. In various embodiments, correlation graph 805 may be plotted for times $T_A$ and $T_B$ corresponding to the peak values for the reaction classifier. For example, if $T_A$ and $T_B$ are the same for various peak values, the peak values are said to be completely correlated (such correlation is shown by a plot 807). In general, $T_A$ and $T_B$ may be correlated but may exhibit incomplete correlation as shown, for example, by points 809 that may deviate slightly from plot 807. In various embodiments, the correlation coefficient for time data plotted in graph 805 may be computed.

Correlation between a classifier score of one user/participant and a classifier score of another user/participant may be an important indication that a change in these scores is caused by a content presented during the conferencing session. If correlation in the between participants is not observed, changes in the classifier score (e.g., a peak shown at time $T_B$ for time dependent plot 803B) may be due to other factors that may not be directly related to the content of the conferencing session (for example, the change in the classifier score may be due to participant B drinking coffee). In various embodiments, when the correlation is observed, CIPS may be configured to show presenter a slide 806 (or any other suitable content) that was communicated to participants by a presenter at the time $T_A$ or/and $T_B$.

Figure 9:
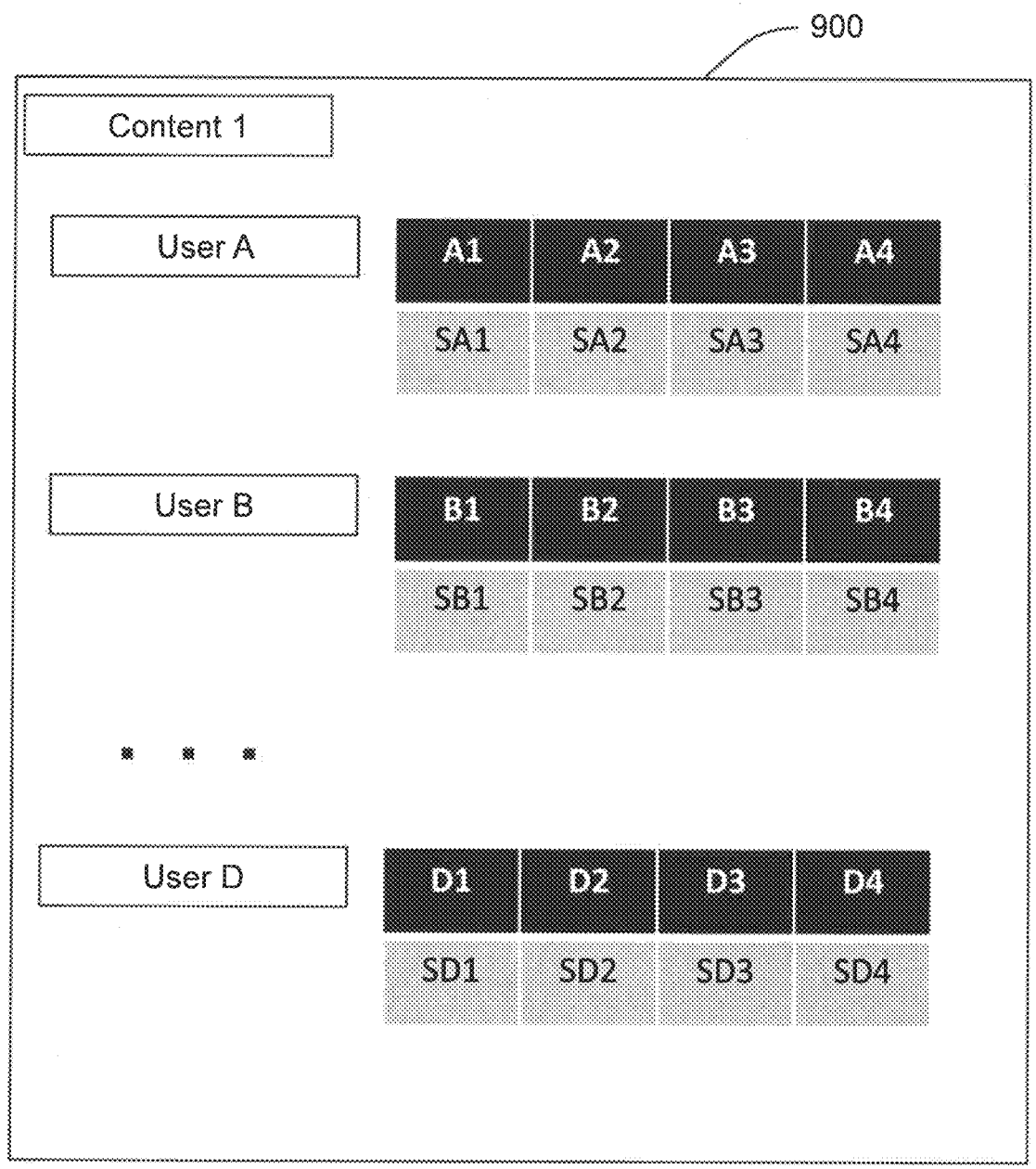
FIG. 9 is a diagram illustrating an example graphical user interface element of a conference interface system for a presenter, consistent with disclosed embodiments.

FIG. 8 presents an interface that shows one example of a correlation that may be observed such as correlation in a change of the classifier scores as a function of time. It should be noted that various other correlations may be evaluated by remote computing system 140 via analysis of reaction classifiers with time-dependent classifier scores, and such correlations may be transmitted to various participants based on their permission configurations. In an example embodiment, a reaction classifier may be observed for a user and correlated with a type of content of the conferencing session. For instance, if a specific content of conferencing session results in a participant exhibiting a reaction classifier "upset" corresponding to the participant being upset with the specific content, such correlation may be transmitted to a presenter. In an example embodiment, various content of the conference session may be associated with a set of reaction classifiers for different users. For example, FIG. 9 shows, an example interface 900 for a presenter for specific content (content 1) of the conferencing session. In an example embodiment, reaction classifiers A1-A4 for user A, reaction classifiers B1-B4 for user B and reaction classifiers D1-D4 for user D, may be displayed for content 1, where content 1 may be a specific slide of the presentation. The reaction classifiers may be different for different users. In some embodiments, reaction classifiers for different users may be the same. For example, reaction classifier A1 and B1 may correspond to the reaction of enjoying the content of the presentation, reaction classifier A4 may correspond to user A being interested in the presentation, and reaction classifier D4 may correspond to user D being upset with the presentation. In various embodiments, for each reaction classifier there can be an associated classifier score, such as scores SA1-SA4 for reaction classifiers A1-A4, scores SB1-SB4 for reaction classifiers B1-B4, and scores SD1-SD4 for reaction classifiers D1-D4. It should be noted, that similar reaction classifiers may be transmitted to the presenter and presented in CIPS 130 of the presenter for other content of the presentation.

Figure 10:
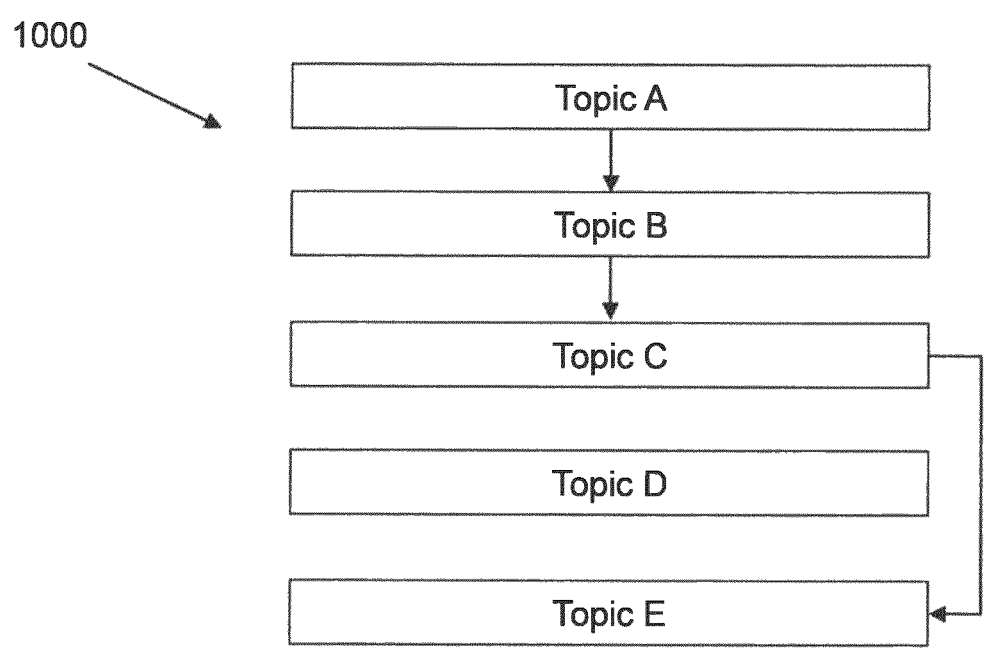
FIG. 10 is a flowchart of an example process for selecting topics of a presentation, consistent with disclosed embodiments.

In various embodiments, the presenter may modify the flow of topics presented during the conferencing session based on the reaction classifiers received from various attendees. FIG. 10 shows an example flow of topics planned to be presented during the conferencing session (e.g., topics A-E). The presenter may choose to skip topic D based on reaction classifiers received from various participants. For instance, if content associated with topic D is poorly understood by the participants, the presenter may choose to skip topic D.

Figure 11:
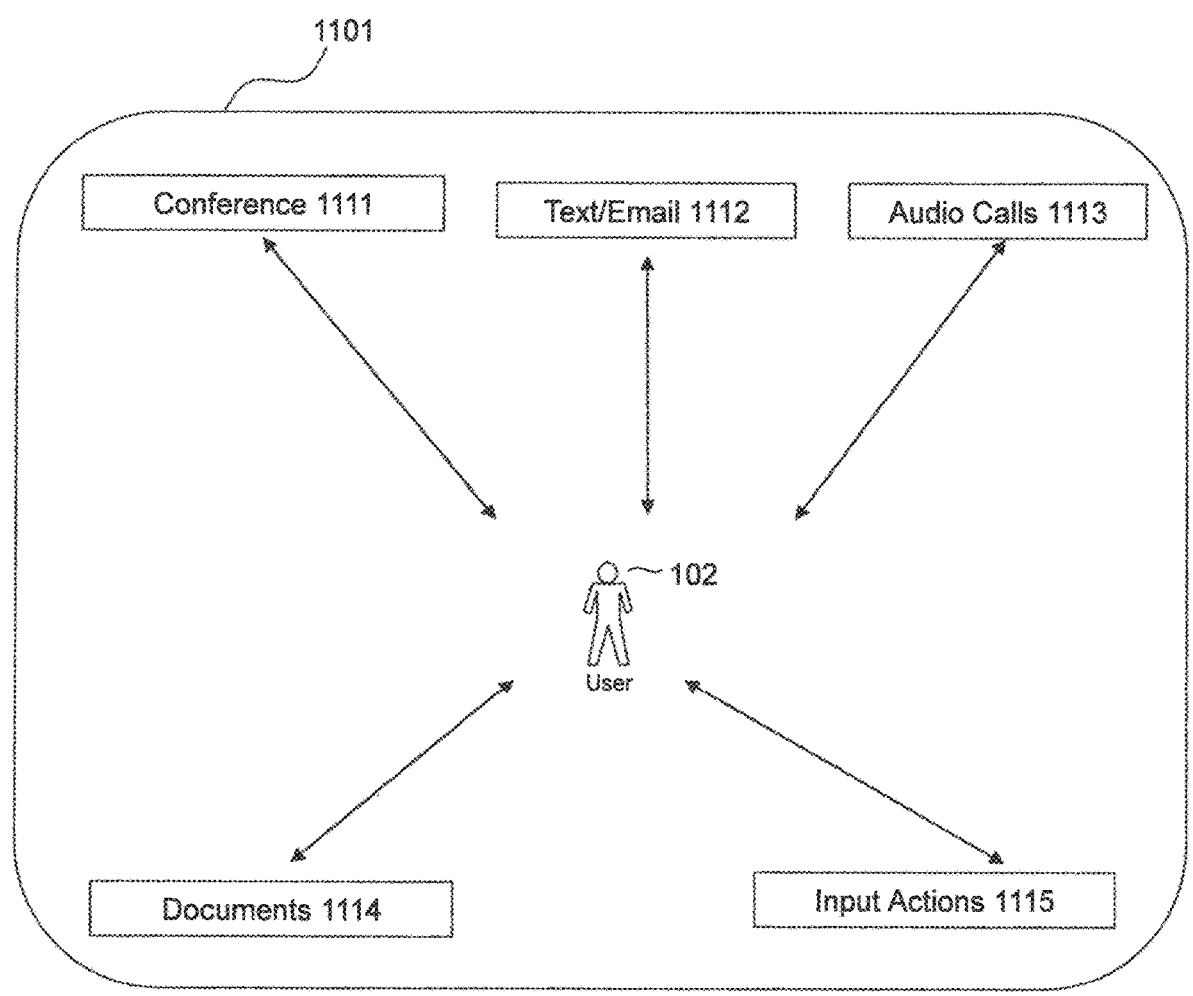
FIG. 11 is an example global monitoring system, consistent with disclosed embodiments.

FIG. 11 shows that reaction classifiers may be collected for participant 102 of the conferencing session even prior to participant's joining the conferencing session. For instance, participant's activity/communications and participant-related events (e.g., doctor's visit) may be monitored by a general monitoring system 1101 throughout a set time window (e.g., the set time window may be a day, a week, a month, a year and/or the like). General monitoring system 1101 may monitor participant's time-dependent data collected by various capturing devices during various conferencing sessions 1111, or audio calls 1113. In addition, system 1101 may analyze text messages 1112, as well as documents 1114, read and written by participant 102, as well as various input actions 1115 of participant 102. In various embodiments, collected data may be communicated to server 351, stored in database 353 and associated with user profile module 357. In some embodiments, events related to participant 102 may be collected and entered into database 353 by a moderator of general monitoring system 1101 or may be submitted to general monitoring system 1101 by other participants interacting with system 1101. Similar to time-dependent input data for a participant during a conferencing session, the data collected by system 1101 may be analyzed by data processing module 355 to obtain various reaction classifiers for the participant.

In various embodiment, events related to participant 102 collected prior to joining a conferencing session may be used to adjust reaction classifiers and related classifier scores observed during the conferencing session. For example, if a participant visited a dentist in the morning before the conferencing session, and may experience a toothache during the conferencing session, a reaction classifier corresponding to participant 102 being happy may not be readily identifiable based on, for example, facial expressions of participant 102. In various embodiments, CIS 130, may be configured to take into account various special considerations related to a state of participant 102 and may be configured to disregard some of the audio or video data collected about participant 102. For example, CIS 130 may be configured not to track facial expressions for participant 102 if participant 102 experiences a toothache. Additionally, or alternatively, reaction classifiers and related classifier scores may be adjusted, provided there is an appropriate artificial intelligence model that is capable of adjusting such parameters based on previously recorded events. For example, an artificial intelligence model may be able to adjust reaction classifiers and related classifier scores when trained to evaluate the impact of typical recurrent events on reaction classifiers and related classifier scores. For instance, a recurrent event may be an absence of coffee in the morning, which may predictably affect reaction classifiers and related classifier scores.

In various embodiments, various data from participants may be recorded on a daily basis and may be analyzed to obtain various correlations. In some embodiments, participants reaction classifiers may be compared for conferencing sessions conducted in the morning, in the afternoon, after lunch, and in the evening to establish the optimal time for the conferencing session. In some embodiments, participant's reaction classifiers may be correlated with the presence of other participants during a conferencing session. For instance, the presence of some participants during the conferencing session may negatively impact reaction classifiers of some other participants (e.g., classifier scores associated with the participant being happiness may be low, and classifier scores associated with the participant being upset may be high). Similarly, some presenters may negatively affect reaction classifiers of some of the participants.

Figure 12:
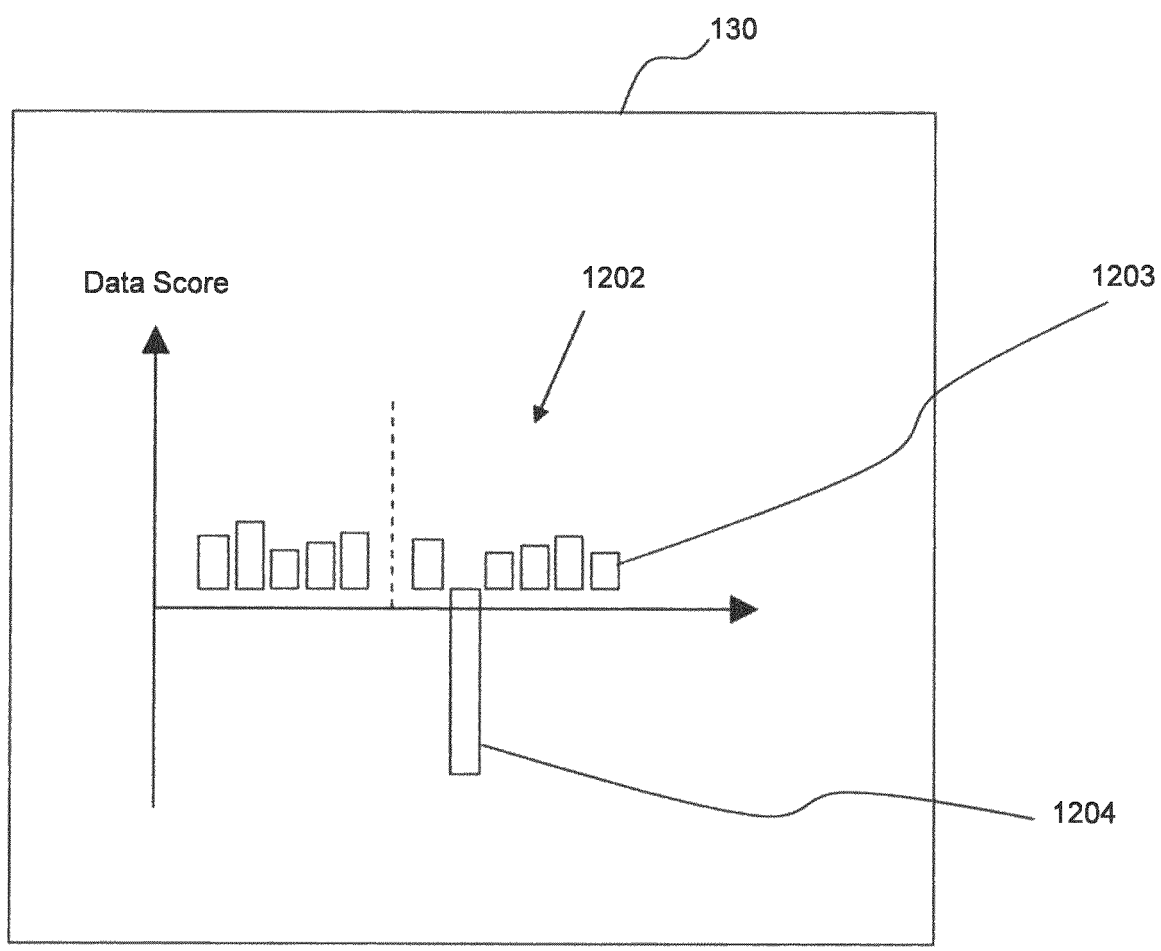
FIG. 12 is an example graph of a data score for a participant, consistent with disclosed embodiments.

While the previous discussion considered embodiments describing sharing reaction classifiers among different participants, other classifiers, such as participant classifiers as well as other data, including correlational data, may be shared among the participants. In an example embodiment, data processing module 355 may analyze the time-dependent input data of participant 102 (that may, for example, be a presenter or an attendee interacting with other participants during a conferencing session) and evaluate the data for consistency. In an example embodiment, FIG. 12 shows CIS 130 that may be, for example, CIAS, that shows a data score 1202 for the time-dependent input data of participant 102. (e.g., the presenter or an attendee). In an example embodiment, data score 1202 may be a consistency score that indicates how consistent the time-dependent input data of participant 102 to previously recorded time-dependent input data for participant 102. For example, data score may be evaluated by transcribing time-dependent audio data and comparing the transcribed data with previously obtained transcriptions from participant 102. In some embodiments, information from participant 102 (e.g., slides from the presenter) may be compared with previously recorded slides. In an example embodiment, shown in FIG. 12, CIS 130 may be configured to plot time-dependent data score 1202. Data score 1202 may include positive values 1203 indicating consistency in the presented data and may include negative values 1204 indicating inconsistency in the presented data. It should be noted that in various embodiments, data score may be evaluated in any suitable and useful way. For example, a data score may compare the consistency of presented time-dependent input data with other available data (that may not necessarily be data previously presented by participant 102). Additionally, or alternatively, data score may include other parameters that can be used to compare a first set of time-dependent data and a given time-dependent data such as novelty of the given time-dependent data, relevancy of the given time-dependent data, and/or the like as compared to the time-dependent data from the first set of the time-dependent data.

In an example embodiment, data processing module 355 may analyze the time-dependent input data of participant 102 and evaluate correlations and differences for a reaction classifier related to a particular topic of discussion, the reaction classifier associated with participant 102 recorded during various conference sessions. For example, data processing module 355, may consider how one or more reaction classifiers are changing as a function of time from one conferencing session to another. For instance, if the first reaction classifier for participant 102 identified participant 102 as "happy" during a first conferencing session related to a discussion of a given topic, and if the second reaction classifier for participant 102 identified participant 102 as "unhappy" during the second conferencing session, data processing module 355 may record discrepancy between the first and the second reaction classifiers in a user profile for further processing (e.g., for establishing that the topic of conferencing session is not related to participant 102 being happy or unhappy). Additionally, or alternatively, data processing module 355 may be configured to detect a first reaction classifier associated with a fake emotion and a second reaction classifier associated with a real emotion during a given conferencing session. For example, participant 102 may pretend to be happy by having a fake smile during a conferencing session. In various embodiments, module 355 may be configured to differentiate a fake emotion (e.g., a fake smile) from a true emotion (e.g., a real smile characterized by contraction of orbicularis oculi muscles). In various embodiments, data processing module 355 may record discrepancy between the first reaction classifier associated with a fake emotion and a second reaction classifier associated with real emotion in a user profile for further processing. In some embodiments, module 355 may inform, via user interface module 314, other participants of the second conferencing session about various observed discrepancies in the reaction classifiers of participant 102.

In some embodiments, data processing module 355 may analyze a time-dependent input data of participant 102 and evaluate correlations and differences for a data score of participant 102 as it relates to the time-dependent input data. For instance, data processing module 355 may evaluate correlations and differences for a first input data from participant 102 for a first conferencing session having a first set of participants, and a second input data from participant 102 for a second conferencing session having a second set of participants. For example, during the first conferencing session, module 355 may record the first input data relating to participant 102 arguing against an idea. During the second conferencing session, module 355 may record the second input data relating to participant 102 arguing for the same idea that he was arguing against during the first conferencing session. In various embodiments, module 355 may find a discrepancy between the first and the second input data for participant 102, and in some embodiments, module 355 may inform, via user interface module 314, other participants of the second conferencing session about such discrepancy in input data for participant 102. In addition, CIS 130 may have a record about varies discrepancies for participant 102 available for further inspection. In various embodiments, conferencing system 100 may be configured to receive time-dependent input data from a participant for an interval of time. As used herein, unless otherwise noted the term "interval of time" refers to a duration of time during a conference when the time-dependent input data is collected/captured. For example, the time-dependent input data may be collected during a first interval of time that may be a first minute of the conferencing session. The collected data may be transmitted to remote computing system 140 and stored in database 353. The second interval of time may follow directly after the first interval of time and may have any suitable duration of time that may not be the same as the duration of time of the first interval of time. For example, the second time interval may be longer or shorter. In an example embodiment, the duration of the time interval may be related to the number of events happened during that time interval. For example, if there are no events (e.g., all the participants are silent, and no information is exchanged), then the duration of time for the interval may be extended. As used herein, the term "event" may include any significant variation in a classifier score for a reaction classifier. In various embodiments, in order to obtain time-dependent (i.e., changing in time) classifier scores for reaction classifiers, duration of the interval of time may be small. For example, the duration of time may range between a few milliseconds to a few minutes.

In various embodiment conferencing system 100 may be configured to receive time-dependent input data such as an audio input (e.g., an attendee speech or background audio), a video input (e.g., attendee facial expressions) and/or action input for at least one participant. In various embodiments, time-dependent input data may be collected by a suitable capturing device (e.g., camera, microphone, etc.). In an example embodiment, conferencing system 100 may receive time-dependent data for all the participants of the conference, and in some embodiments, time-dependent input data of some participants may be collected and time-dependent input data of other participants may not be collected. For example, participants may choose whether time-dependent input data related to their interaction with conferencing system 100 is collected. In some embodiments, by participating in the conference, participants are required to share time-dependent input data related to their interaction with conferencing system 100.

In various embodiments, conferencing system 100 may receive profile data for a participant, as well as the time-dependent input data for a participant and using computer-based models of remote computing system 140 to analyze data and obtain at least one reaction classifier as well as the classifier score related to that reaction classifier. In some embodiments, the obtained reaction classifiers may be stored in database 353 and be associated with user profile module 357, and in some embodiments, these reaction classifiers may be transmitted to selected users. For example, in some embodiments, conferencing system 100 may be configured to transmit reaction classifiers obtained for different attendees to a presenter.

In various embodiments, various participants may have permissions that determine what information may be collected and shared about the participant during a conferencing session and what information the participant may be able to access. The term "permissions" may generally refer to permissions for accessing and sharing information during a conferencing session. For example, the permissions may include allowing a participant to receive selected reaction classifiers as well as relates classifier scores from other participants. In an example embodiment, permissions may define what type of reaction classifiers a participant may receive from another participant during a conferencing session. In some embodiments, permissions may define which participants may share the associated reaction classifiers with which other participants.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A conferencing system configured, for an interval of time, to:
   receive time-dependent input data from a first user, the time-dependent input data obtained via a capturing device;
   receive profile data for the first user;
   analyze the time-dependent input data and the profile data for the first user using a computer-based model to obtain at least one classifier score for a reaction classifier; and
   transmit the at least one classifier score for the reaction classifier to a second user.

2. The system of claim 1, wherein the time-dependent input data comprises a sequence of images of a face of the first user, and wherein obtaining the at least one classifier score for the reaction classifier comprises:
   applying the computer-based model for identifying an emotion of the first user from the sequence of the images;
   assigning the reaction classifier to the identified emotion;
   applying a computer-based model for identifying an amplitude of the emotion; and
   assigning the classifier score for the identified amplitude.

3. The system of claim 1, wherein the time-dependent input data comprises one of an audio input, a video input, or an action input.

4. The system of claim 1, wherein the time-dependent input data comprises an audio data of a speech, including a sequence of phonemes of the first user; and wherein obtaining the at least one classifier score for the reaction classifier comprises:
   applying the computer-based model for identifying an emotion of the first user from the sequence of the phonemes;
   assigning the reaction classifier to the identified emotion;
   applying the computer-based model for identifying an amplitude of the emotion; and
   assigning the classifier score for the identified amplitude.

5. The system of claim 4, wherein the audio data comprises information about at least one of a pitch, a volume, or a tempo of the speech.

6. The system of claim 1, wherein the first and the second user have associated permissions.

7. The system of claim 1, further configured to allow a plurality of first users to participate in a conference.

8. The system of claim 7, further configured to transmit the classifier scores for the reaction classifiers obtained for all of the first users to the second user.

9. The system of claim 8, wherein the second user is configured to select a presenter from the plurality of the first users, and wherein the second user is configured to transmit at least one classifier score for the reaction classifier to the presenter.

10. The system of claim 7, further configured to provide a conference interface for the second user, the conference interface enabling the second user to observe the reaction classifier scores for the reaction classifiers for the plurality of the first users.

11. The system of claim 10, wherein the conference interface is configured to evaluate a correlation between the classifier scores for the reaction classifiers of the plurality of the first users.

12. The system of claim 1, wherein the classifier score for the reaction classifier is evaluated using the computer-based model comprising a neural network.

13. The system of claim 1, wherein the conferencing system is further configured to deliver a presentation to the first user, and wherein the reaction classifier obtained for the first user is for a reaction comprising one of an emotional state or intellectual state.

14. The system of claim 13, wherein the emotional state includes one of frustration with the presentation, anger towards the presentation, enjoyment of the presentation, condescending reaction to a presenter of the presentation, respect to the presenter, and wherein the intellectual state includes one of understanding of the presentation, attention to the presentation, or participation in the presentation.

15. A method for determining a time-dependent reaction classifier score for a reaction classifier for a user of a conferencing session comprising:
    for an interval of time obtaining, via a capturing device, a time-dependent input data for the user;
    obtaining a base classifier score for the reaction classifier for the user by analyzing profile data for the user;
    analyzing the time-dependent input data for the user using a computer-based model to obtain the time-dependent reaction classifier score for the reaction classifier; and
    adjusting the time-dependent reaction classifier score for the reaction classifier based on the base classifier score.

16. The method of claim 15, wherein the profile data for the user comprises at least one time-dependent classifier score for the reaction classifier recorded during at least one previous conferencing session, and wherein computing the base classifier score comprises:
    obtaining at least one time average value of the at least one time-dependent classifier score for the reaction classifier, and
    when more than one time average value is obtained, averaging the time average values.

17. The method of claim 16, wherein a plurality of the time-dependent reaction classifier scores for the reaction classifier is determined for a plurality of the users.

18. The method of claim 17, further comprising:
    evaluating a correlation between the time-dependent classifier scores for the reaction classifier for the plurality of the users.

19. A conferencing system comprising:
    a database;
    an interface configured, for an interval of time, to:
        receive time-dependent input data from a first user, the time-dependent input data obtained via a capturing device;
        transmit the time-dependent input data to a computing system; and
    the computing system configured to:
        receive profile data for the first user;
        analyze the time-dependent input data and the profile data for the first user using a computer-based model to obtain at least one data score; and
        transmit the at least one data score to a second user.

20. The system of claim 19, wherein the second user is configured to be a presenter, and wherein a data score for the presenter indicates a correlation between the time-dependent input data and previously presented time-dependent input data by the presenter.

\* \* \* \* \*